(12) United States Patent
Benameur et al.

(10) Patent No.: US 8,640,208 B2
(45) Date of Patent: Jan. 28, 2014

(54) AUTHENTICATION ENFORCEMENT AT RESOURCE LEVEL

(75) Inventors: Azzedine Benameur, Caromb (FR); Paul El Khoury, Antibes (FR); Cedric S. P. Ulmer, Nice (FR)

(73) Assignee: SAP AG, Walldorf (DE)

( * ) Notice: Subject to any disclaimer, the term of this patent is extended or adjusted under 35 U.S.C. 154(b) by 800 days.

(21) Appl. No.: 11/998,141

(22) Filed: Nov. 28, 2007

(65) Prior Publication Data

US 2009/0025068 A1 Jan. 22, 2009

(30) Foreign Application Priority Data

Jul. 17, 2007 (EP) .................................. 07290889

(51) Int. Cl.
H04L 9/32 (2006.01)
G06F 21/00 (2013.01)

(52) U.S. Cl.
USPC .................................. 726/5; 726/19; 713/193

(58) Field of Classification Search
USPC .......................................................... 726/2
See application file for complete search history.

(56) References Cited

U.S. PATENT DOCUMENTS

| 5,771,291 A * | 6/1998 | Newton et al. ................. 713/185 |
| 2002/0066038 A1 | 5/2002 | Mattsson et al. |
| 2004/0123104 A1 | 6/2004 | Boyen et al. |
| 2005/0038724 A1* | 2/2005 | Roever et al. .................... 705/35 |

OTHER PUBLICATIONS

Lewis, Sharon R., et al., "Providing Security in a Phone Book Database Using Triggers", Defense Research A.qency, St. Andrews Road, Malvern, Worcestershire, WR14 3PS, UK, It is proposed that all database security controls, except those which provide information flow security, can be built using a suitable trigger mechanism., 86-96.*
Burns, Rae K, "Referential Secrecy", 1990 IEEE Computer Society Symposium on Research in Securty and Privacy May 7-9, 1990 Oakland, CA, Kanne Associates Inc. Engineering, IEEE Computer Society Press, Feb. 1988, 133-142.*
"International Application Serial No. 07290889.0, Extended European Search Report mailed Feb. 27, 2008", 9 pgs.
Burns, Rae K, "Referential Secrecy", 1990 *IEEE Computer Society Symposium on Research in Security and Privacy* May 7-9, 1990 Oakland, CA, Kanne Associates Inc. Engineering, IEEE Computer Society Press, Feb. 1988, 133-142.
Codd, E. F, "A Relational Model of Data for Large Shared Databanks", *Commun. ACM* 13(6), (1970), 377-387.
Hwang, Kai, "Wireless PKI and Distributed IDS for Securing Intranets and M-Comerce", *IEEE third International Conference on Parallel and Distributed Computing, Applications and Technologies (PDCAT 2002)*, (Sep. 2002), 16 pgs.

(Continued)

*Primary Examiner* — Gilberto Barron, Jr.
*Assistant Examiner* — Devin Almeida
(74) *Attorney, Agent, or Firm* — Schwegman Lundberg & Woessner, P.A.

(57) ABSTRACT

The present description refers in particular to a computer-implemented method, a computer system, and a computer program product. The method may comprise providing authentication enforcement at resource level by specifying at design time at least one authentication key for at least one data storage unit of a resource. A request may be received at a server from a requester through a client to access the resource. Authentication of the requester may be enforced through the at least one authentication key at the at least one data storage unit of the resource.

22 Claims, 7 Drawing Sheets

R1(PK = AK, Attr1, Attr2)

R2(PK1=FK, PK2, Attr3)

160

| r1 | | | | r2 | | |
|---|---|---|---|---|---|---|
| PK = AK | Attr1 | Attr2 | | PK1 = FK | PK2 | Attr3 |
| 0815 | John | Smith | ← t1 | 0815 | jsm | employee | ← t2 |
| 4711 | Bob | Miller | | ... | ... | ... |
| ... | ... | ... | | | | |

(56) References Cited

OTHER PUBLICATIONS

Lewis, Sharon R., et al., "Providing Security in a Phone Book Database Using Triggers", *Defense Research Agency*, St. Andrews Road, Malvern, Worcestershire, WR14 3PS, UK, It is proposed that all database security controls, except those which provide information flow security, can be built using a suitable trigger mechanism., 86-96.

Marchesini,, John, et al., "Keyjacking: Risk of the Current Client-Side Infrastructure", *2nd Annual PKI Research Workshop*, 17 pgs.

Webyog, "Download—MySQL Frontend, MySQL Monitoring Tool", [Online]. Retrieved from the Internet: <URL: http://www.webyog.com/en/downloads.php>, (Jun. 26, 2008), 2 pgs.

* cited by examiner

```
CREATE TRIGGER patient_authentication
FOR Patient BEFORE UPDATE EXECUTE
(TRY
IF NEW.fname <> OLD.fname
THEN
IF NEW.ssn = OLD.ssn
THEN UPDATE Patient.fname SET fname = :NEW.fname
WHERE ssn = :OLD.ssn;
CATCH
IF NEW.ssn <> OLD.ssn
THEN
ROLLBACK;
)
```

AUTHENTICATION ENFORCEMENT AT RESOURCE LEVEL

CLAIM OF PRIORITY

The present patent application claims the priority benefit of the filing date of European Application (EPO) No. 07290889.0 filed Jul. 17, 2007, the entire content of which is incorporated herein by reference.

TECHNICAL FIELD

The description is directed generally to security mechanisms for computer systems, in particular to algorithms for authentication enforcement in a client-server architecture, and more particularly, to a method, a system, and a computer program product for authentication enforcement at resource level.

BACKGROUND

On the one hand side, web applications comprising sensitive data (e.g. e-commerce and e-banking applications) need to be based on a secure and reliable architecture. On the other hand side, hackers exploit software applications for self-esteem or malicious intention. Regardless of any motivation, software developers should implement security mechanisms which are able to limit malicious behaviors. The frequent and basic target field usually is a client-server architecture, where the client may be any type of application. A server, which is sometimes called a daemon, is activated and awaits a client's request to access one or more resources. Usually, multiple client programs share the services and/or resources of a common server or common server programs. For such applications authentication may be crucial for data transactions from the client to the server and the underlying resource and back to the client. Hence, authentication mechanisms are necessary, which prevent fraudulent attacks to such applications.

DETAILED DESCRIPTION

In one general aspect, a computer-implemented method may comprise:
providing authentication enforcement at resource level by:
specifying at design time at least one authentication key for at least one data storage unit of a resource;
receiving at a server a request from a requester through a client to access the resource; and
enforcing authentication of the requester through the at least one authentication key at the at least one data storage unit of the resource.

In other words, an authentication mechanism for a multi-layer web application based on a client-server architecture may be provided. The architecture may comprise at least one client through which a requester or user may query at least one resource, which is accessible through a server. For this purpose, the server may provide a web site through which the requester may query the at least one underlying resource from his/her client (e.g. using a browser running on the client). In order to provide secure and reliable access to the at least one resource, the authentication mechanism may be implemented in the at least one resource such as a database management system. Implementation of the authentication mechanism may comprise defining at least one authentication key for at least one data storage unit (e.g. a table of a relational database) of the at least one resource. Authentication of the requester querying the resource may be enforced through the at least one authentication key by challenging the requester to provide at least one corresponding credential. Hence, whenever a requester tries to query the resource through the server from his/her client, at least one authentication key challenges the requester for at least one corresponding authentication credential.

Basically, verification for accessing one or more protected resources through a client-server architecture comprises first authenticating and second authorizing the requester querying the resource. Authentication may be performed at different levels of the architecture, i.e. at the client (level), the server (level), and/or the resource (level). Unfortunately, fraudulent attacks of authentication both at the client level and at the server level may be established, e.g. by disabling the authentication at the client or by using a cover channel to sidestep authentication at the server. Hence, when implementing alternatively or additionally authentication at the resource level, reliable and security of the resource may be enhanced.

According to another aspect, the enforcing authentication of the requester may further comprise: propagating the at least one authentication key through at least one cross-reference between the at least one data storage unit and at least one further data storage unit, wherein the at least one cross-reference may be at least one referential integrity constraint between the data storage unit and the at least one further data storage unit.

In other words, authentication keys may be defined only for some data storage units of a plurality of data storage units of a resource. Therefore, and in order to ensure secure access also to those data storage units having no explicitly defined authentication key, the authentication keys may be propagated to those data storage units using referential integrity constraints defined for the resource.

Propagating authentication keys the resource's referential integrity constraints may enhance the authentication efficiency to the level of the resource as a whole. Furthermore, the referential integrity constraints may ensure a correct propagation of at least one authentication key between at least two different data storage units of the resource.

According to yet another aspect, the method may further comprise: monitoring the at least one authentication key by at least one trigger.

Using triggers to enforce authentication on the resource level using at least one authentication key logically labeled to at least one data storage unit of the resource provides additional capacity to efficiently enforce an authorization mechanism on the resource level after authentication.

According to yet another aspect, the at least one trigger may oblige the requester to provide at least one credential represented by the at least one authentication key.

According to yet another aspect, enforcing may be performed by enforcing the at least one authentication key through at least one trigger operation prior to an insert, update, and/or delete operation performed on the at least one data storage unit.

According to yet another aspect, enforcing may be performed by enforcing the at least one authentication key through a database management system (DBMS).

According to yet another aspect, the method may further comprise: invoking a rollback operation in case of an authentication failure.

In another general aspect there is provided a computer-program product comprising computer readable instructions, which when loaded and run in a computer system and/or computer network system, cause the computer system and/or the computer network system to perform a method as described.

In yet another general aspect, a computer system may comprise:
an authentication mechanism for authentication enforcement at resource level, operable to:
specify at design time at least one authentication key for at least one data storage unit of a resource;
receive at a server a request from a requester through a client to access the resource; and
enforce authentication of the requester through the at least one authentication key at the at least one data storage unit of the resource.

According to yet another aspect, the system is further operable to perform operations according to any one of the described methods.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

Details of one or more implementations are set forth in the accompanying example drawings and example description below. Other features will be apparent from the description and drawings, and from the claims.

Technical Terms

Following technical terms are widely used throughout the description. The terms may refer to but are not limited to the subsequently given explanations.

Authentication vs. Authorization:

It may be easy to confuse the mechanism of authentication with that of authorization. In host-based systems (and possibly even in some client/server systems) the two mechanisms may be performed by substantially the same physical hardware and, in some cases, the same software. It may be important to draw a distinction between these two mechanisms, since they can (and actually should) be performed by separate systems.

Authentication may be a mechanism such that computer systems may securely identify their users. In other words, an authentication mechanism may provide an answer to the questions: (i) Who is the user? and (ii) Is the user really who he/she represents himself/herself to be? I.e. authentication may verify who you are (credentials). Authentication mechanisms substantially depend on some unique bit of information known (or available) only to the person being authenticated and the authentication system, referred to as a shared secret. In order to verify the identity of a user, the authentication system may challenge the user to provide his unique information (i.e. the shared secret), and if the authentication system can verify that the shared secret was presented correctly, the user is considered authenticated. An example of an authentication system is Kerberos. A real life example of authentication may be a passport.

Authorization, by contrast, may be a mechanism by which a computer system determines what level of access a particular (possibly authenticated) user should have to protected resources controlled by the system. In other words, an authorization mechanism may provide answers to the questions: (i) Is user X authorized to access resource R? (ii) Is user X authorized to perform operation P? and (iii) Is user X authorized to perform operation P on resource X? I.e. authorization may verify what a user is authorized to do (and/or be able to see). An example of an authorization mechanism may be a policy. A real life example of authorization may be a visa in a passport.

Primary Key:

A primary key of a relational table of a relational database substantially uniquely identifies each tuple in the table. The primary key may be either at least one attribute of the table that is guaranteed to be unique or it may be generated by the database management system (DBMS). A primary key may comprise a single attribute of a table or a plurality of attributes of a table in combination.

Foreign Key:

A foreign key may be a field (i.e. a value of an attribute) in a relational table that matches a primary key column (i.e. an attribute which is the primary key) of another table. Foreign keys may be used to cross-reference tables in a (relational) database.

Authentication Key:

An authentication key may be defined as a logical key introduced or defined (e.g. by a database administrator) at design time of a database 160. At least one authentication key may be associated with at least one table of the database 160. The at least one authentication key may be an attribute of the at least one table. In one aspect, the at least one authentication key may be used to authenticate a requester 170-3 of each tuple in the at least one table of the database 160. A database 160 may comprise one or more authentication keys. An authentication key may not include a null value, otherwise it does not provide any additional authentication measure. Furthermore, an authentication key may be inherited through referential integrity constraints defined for a database 160.

Referential Integrity:

Referential integrity in a relational database may be consistency between coupled tables. Referential integrity may be enforced by a combination of a primary key and a foreign key. For referential integrity to hold in a database, any field in a table that is declared a foreign key can contain only values from a parent table's primary key. A relational DBMS may enforce referential integrity substantially either by deleting the foreign key rows to maintain integrity or by returning an error and not performing the delete. In other words, referential integrity constraints may be constraints involving two relations and may be used to specify a relationship among tuples where the referencing relation may include the foreign key and the referenced relation may include the primary key. A referential integrity constraint may be specified in a relational database schema by a directed edge from the referencing relation to the referenced relation.

Database Trigger:

(Database) Triggers may be programs that are automatically executed in response to certain events on a particular table in a database. One may distinguish two classes of triggers, row triggers and statement triggers. Using row triggers, an action for every row of a table may be defined. Statement triggers may occur only once per insert, update, or delete statement. Triggers may not be used to audit data retrieval via select statements. A trigger may include one or more statements (e.g. SQL statements) and/or a series of control structures. Additionally, a database administrator may specify program loops and/or branches within a trigger. For example, when a trigger is implemented for an insert operation, the trigger will be triggered each time an insert query statement is executed. The actions programmed within the trigger may be automatically executed prior to any new insert entry in the table. Furthermore, the trigger may be programmed to depend on particular preconditions. A precondition may be for example to check whether the data to be inserted in the database is correct in a certain sense.

exampleexampleexampleexample-
exampleexampleexampleexample

In the following, a detailed description of examples will be given with reference to the drawings. It should be understood that various modifications to the examples may be made. In particular, elements of one example may be combined and used in other examples to form new examples.

Figure 7:
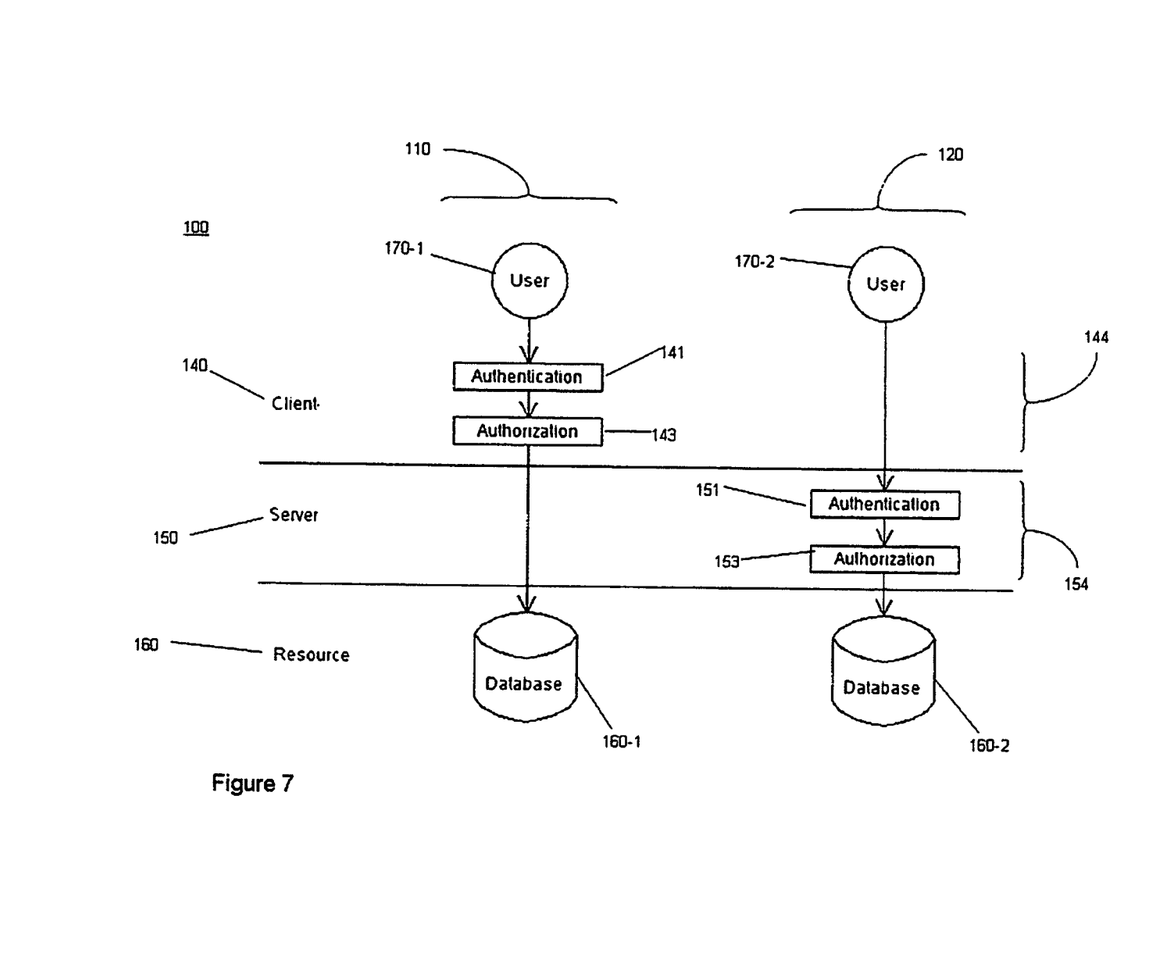
FIG. 7 shows different example authentication and authorization mechanisms being propagated at a client-level and at a server-level of a client-server architecture.

FIG. 7 shows an example (web) architecture 100 having at least three layers: a client 140, a server 150, and at least one resource 160. In order to ensure secured access to the server 150 and, in particular, to the resource 160, security mechanisms 144, 154 are applied. Considering the enforcement side of security mechanisms 144, 154 comprising authentication and authorization in a client-server architecture, each transaction (form a client 140 to a server 150 in order to access at least one resource 160 and back to the client 140) may require three steps till fetch. Firstly authenticate the user or requester 170, then control the authorized operations according to the authentication and finally restrict fetching of the data queried from a resource 160 to the authorized requester 170. In such a scenario authentication may be crucial for the transactions. Its failure may (catastrophically) disrupt the access control procedure and cause costly fraud for operators of web applications.

With reference to FIG. 7, a client 140 is considered to be a user's or requester's 170-1, 170-2 machine. The server 150 is considered as a processing machine and a resource 160 is considered to be a data storage unit or device such as a database 160-1, 160-2 accessible through the server 150.

In a first example of a (web) application 110 focused on secure access to a resource 160-1, enforcement of authentication 141 and authorization 143 at the client level or layer 144 are shown. An approach for authentication 141 at the client-level 144 may be based on a scripting language such as VBScript and JavaScript saving the client's 140 authentication credits at the client-level 144 either through cookies or registry files or on authentication mechanisms based on the IP address of the client 140. Different attacks (e.g. client-side penetration testing with core impact, core security technologies which are available at http://www.accelacomm.com/jlp/site/11/6345/or M. Z. John Marchesini, S. W. Smith. Keyjacking: Risk of the current client-side infrastructure. In 2nd Annual PKI Research Workshop) may be used to fraud authentication on the client level 144 which show the vulnerabilities of this type of authentication on the client level by disabling the authentication at the client machine 140 of the application 110 or by simply bypassing it.

In a second example of a (web) application 120 focused on secured access to a resource 160-2, enforcement of authentication 151 and authorization 153 at the server level or layer 154 are shown. The server-level 154 authentication 151 may be considered to be a (substantially) effective technique to authenticate a requester or user 170-2 through his/her credential stored at a well trusted authority party. By using a server-side script like PHP or CGI, a web sites (on the server 150) may enforce log-in pages whereby members and administrators are allowed to access at least one restricted resource 160-2. However, this enforcement point may be overcome through so called cover channels (e.g. Sqlyog mysql, webyog softworks private limited available for 30 days trial download at: http://www.webyog.com/en/downloads.php). As a matter of fact, most of the fraudulent attacks are established by internal employees. Thus, secure access to resources through a client-server architecture 100 may not be guaranteed by using an authentication mechanism 151 at the server-level 154.

Due to vulnerabilities proven to persist either at a client 140 or a server 150 in a client-server architecture 100 such as a (multi-layer) web architecture as shown with reference to FIG. 7, a need of secure and reliable authentication mechanisms for web-based transactions through a web architecture 100 is increased. Basically, verification for accessing one or more protected or restricted resources 160 such as a database 160-3 through a client-server architecture 130 consists of first authenticating and second authorizing a requester or user 170-3. With reference to verification at a client level 144 and/or at a server level 154, fraud and misuse may be present. Consequently, verification comprising authentication 161 and authorization 163 should be enforced at a resource level 164. In other words, also at the resource level 164, authentication 161 is enforced prior to authorization 163 as shown in FIG. 1.

Furthermore, considering for example a web application 130, where a dynamic web site located on a server 150 provides access to at least one protected or restricted resource 160. Usually, the web site that generates dynamic pages does not have full control over how their outputs are interpreted by a client 140 (and in particular, a browser running on the client 140). Hence, if mistrusted content can be introduced into a dynamic page, neither the web site on the server 150 nor the client 140 has enough information to recognize that this has happen. Following that, neither the server 150 nor the client 140 may take protective actions, accordingly. To overcome this problem, an approach for authentication 161 at the resource level 164 is suggested as shown in FIG. 1.

Figure 3:
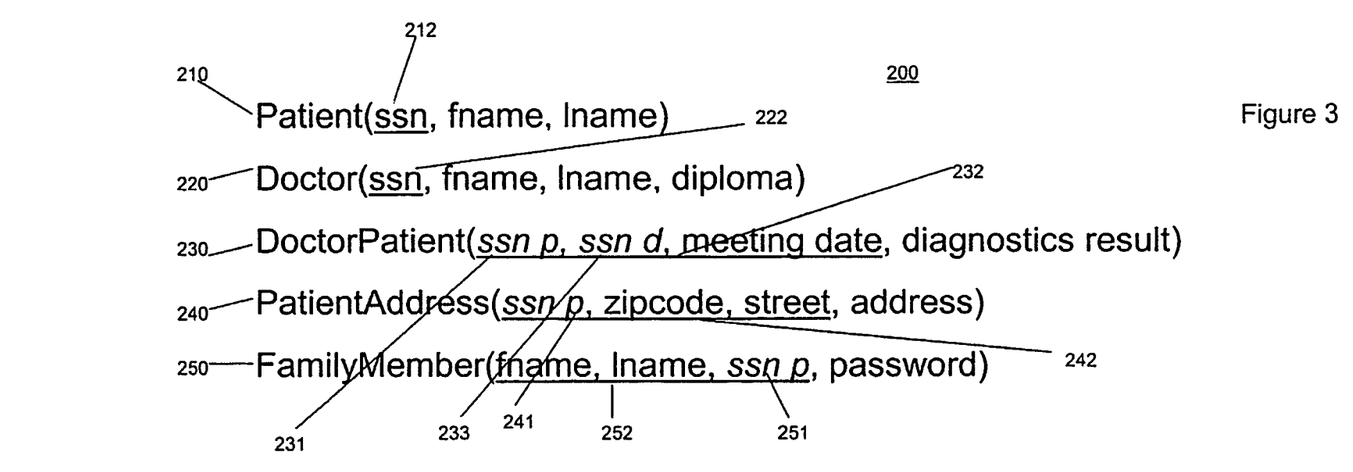
FIG. 3 shows an example specification of relations of a relational database.
Figure 3A:
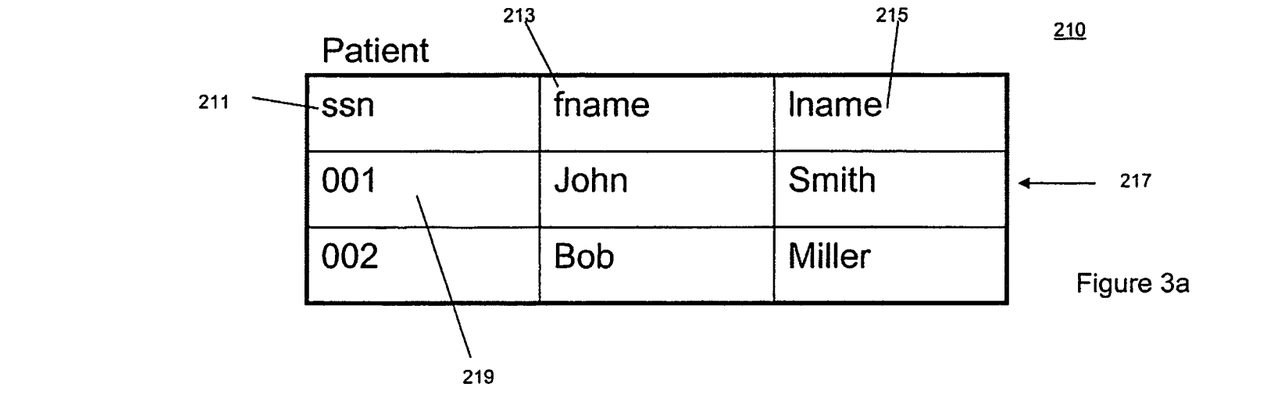
FIG. 3a shows an example (database) table of a relation database.

In one implementation, a resource 160 may be a relational database 160-3 of a relational database management system (RDBMS) like an SQL database such as Oracle. A relational database is based on the relational model as described in E. F. Codd. A relational model of data for large shared databanks. Commun. ACM, 13(6):377-387, 1970. In a relational database, an instance of a (finite) relation (substantially in the mathematical sense of relations) over n attributes may be represented by a table. In a table, 1 to n attributes of possibly different domains represent the columns. Tuples represent the rows. The domains define possible values for the fields. A schema of the relation is the table's definition. Examples, of relations of a relational database are shown in FIG. 3. FIG. 3a shows an example table of one of the relations of FIG. 3a. For example, a relation Patient 210 having attributes ssn, fname, and lname is shown in FIG. 3. An instance of the Patient relation 210 represented in terms of a table 210 is shown in FIG. 3a. The table 210 comprises the attributes ssn 211, fname 213, and lname 215. The attribute ssn 211 may have the domain integers, for example. A tuple 217 of the table 210 is, for example the first row of the table 2610 comprising the values 001, John, Smith of the corresponding attributes ssn 211, fname 213, and lname 215. 001 is a value of attribute ssn 211 and determines a field 219 of the table 210.

Figure 1:
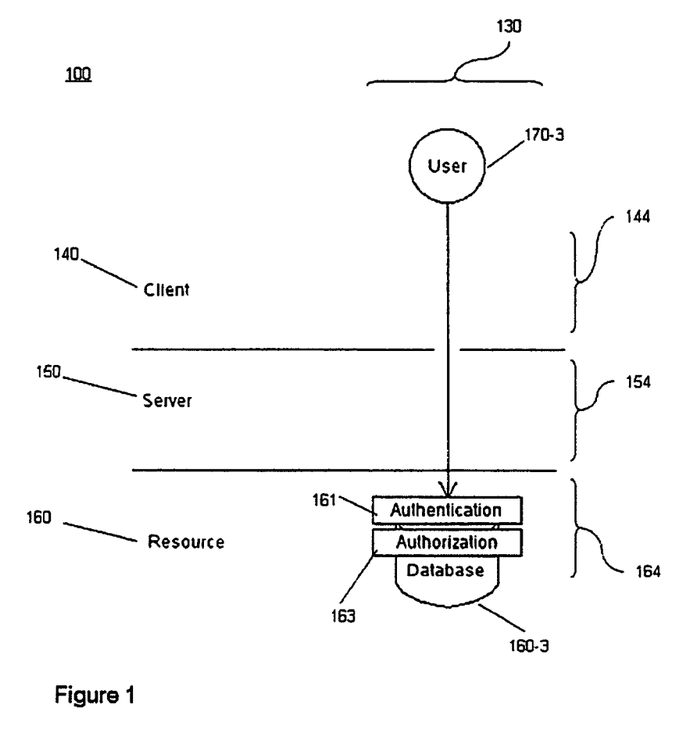
FIG. 1 shows example authentication and authorization mechanisms being propagated at resource level in a client-server architecture.

An authentication mechanism 161 as shown in FIG. 1 is enforced at the resource level 164 of a web application 130 based on a client-server architecture 100. In other words, a verification phase at the resource-level 164 composed of authentication and then authorization is implemented. An authentication mechanism 161 and its enforcement operate on the resource level 164 of a web transaction flow from a requester 170-3 at a client 140 to a server 150, which provides access to an underlying resource 160-3 such as a database is shown in FIG. 1. Accordingly, one or more data storage units, e.g. objects or tables of the resource 160-3 define the last layer of such a multi-layer web application 130. This layer is referred hereinafter to as data storage layer or table layer or level. The authentication mechanism 161 is triggered from one or more data storage units of the resource 160-3 holding the required data (e.g. at least one authentication key). At least one authentication key is defined for at least one data storage unit of the resource 160-3. It is assumed that an insider will not be able to get the at least one authentication key of the at least one storage data unit. Propagation or enforcement of the authentication mechanism 161 may depend on referential integrity among one or more data storage units of the resource 160-3. In one implementation the one or more data storage units may be one or more tables of a relational database 160-3.

In one implementation, an authentication mechanism 161 is implemented in a database 160-3, wherein the database 160-3 may be at least one fundamental storage resource of a (web) application 130 realized in a client-server architecture 100. The authentication mechanism 161 may be enforced at table level of the database 160-3. For this purpose, at least one table is (logically) labeled with at least one authentication key. Furthermore, an underlying system (or application or program) or the database management system monitors the at least one authentication key, e.g. by using at least one trigger. The at least one trigger asks for a user's or requester's 170-3 authentication when the requester 170-3 tries to access the database 160-3 through a server 150 from his/her client 140. In other words, the at least one trigger obliges the requester 170-3 querying the database 160-3 (and more particular the tables of the database 160-3) through a web interface on the server 150 to provide at least one required credential represented by the authentication key for at least one of the tables of the database 160-3. The authentication key may be an attribute in a table of the database 160-3.

Figure 2:
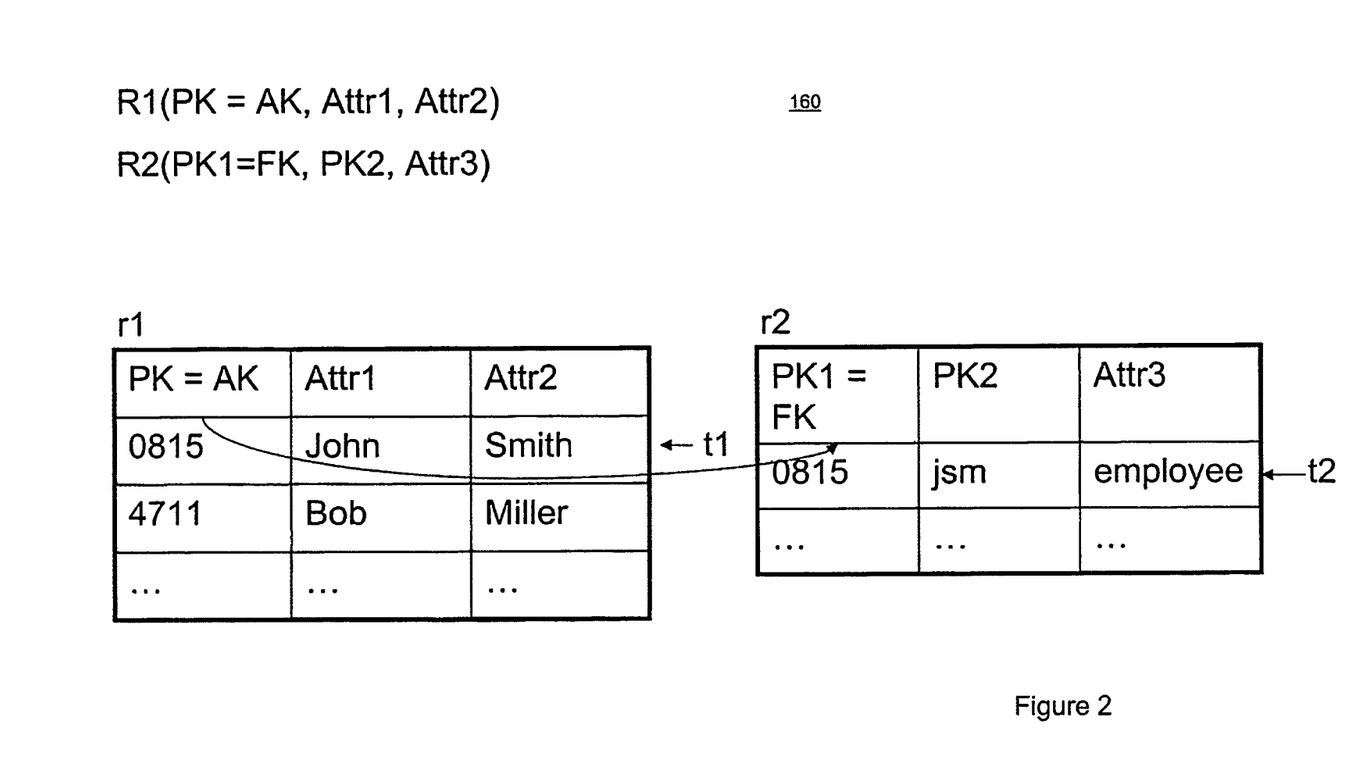
FIG. 2 shows example relations of a relational database and corresponding relation instances represented in terms of (database) tables.

(Relational) integrity constraints may allow for controlling relationships between data of more than one data storage unit (e.g. table) of a database. Furthermore, relational integrity constraints enforce rules on the data stored in one or more data storage units (e.g. tables) of the database across the one or more data storage units (tables). In general, relational integrity constraints for a relational database may be available in three types, key constraints, entity constraints, and referential integrity constraints. In the following these concepts are example explained with reference to relational database management systems as shown in FIG. 2.

Key constraints (substantially) can either be of type super key SK of a relation R or other. A super key of a relation R is a set of attributes SK of the relation R such that no two tuples in any valid relation instance r(R) will have the same value for the super key SK. A key is a minimal super key if and only if removal of any attribute from this key will make it none super key.

Entity constraints may be applied to all attributes of a relation. In one implementation, entity constraints may be limited to a constraint that primary keys of one or more tables of a relation database cannot have null values.

Referential integrity constraints are constraints involving two relations of a relational database. Referential integrity constraints may be used to specify at least one relationship between at least two different tuples of at least two different tables of a database. In one implementation as shown with reference to FIG. 2, a referencing relation R2 of a referential integrity may contain at least one foreign key FK and a referenced relation R1 may contain at least one primary key PK. In other words, a tuple t1 in relation instance (or table) r1 is said to reference a tuple t2 in table r2 if t1[FK]=t2[PK]. Integrity constraints for a foreign key referencing relation R1 may be either (1) a value of an existing primary key value of the corresponding primary key in the referenced relation R2 or (2) a null value.

With reference to FIG. 2 possible enforcement strategies for an authentication mechanism 161 on a resource level 164 and more particular on the data storage level or table level of a resource 160 in a multi-layer web application 130 is shown. In one implementation, the authentication mechanism 161 is implemented in a relational database 160, wherein at least one authentication key is defined or introduced at design time for at least one table of one or more tables comprised in the database 160.

In one example aspect, the authentication mechanism 161 is enforced through or by the underlying database management system (DBMS) in a similar manner as referential integrity constraints are enforced through the DBMS e.g. in a Oracle database management system.

In another example aspect, the authentication mechanism 161 is enforced through at least one trigger operation (substantially) prior to any insert, update, and/or delete operation asked by a requester or user 170-3. Having introduced or defined at least one authentication key for at least one table of one or more tables of the database 160, the at least one authentication key is propagated through one or more referential integrity constraints defined for the database 160. In other words, after the authentication keys are labeled on one or more tables, they are propagated through the database's referential integrity constraints. Propagating at least one authentication key through referential integrity constraints of a database 160-3 enhances the authentication efficiency to the level of the database 160 as a whole. Triggers are used to implement the propagation for the authentication key once possible. Whenever a requester 170-3 tries to access the database 160 through a server 150 from his/her client 140, at least one authentication key challenges the requester 170-3 for at least one corresponding authentication credential.

Referential integrity constraints of a (relational) database 160 define one or more relations between at least one primary key PK and at least one foreign key FK. The one or more relations may be synchronization relations between at least two tables of the database 160. Thus, referential integrity constraints ensure a correct propagation of the at least one authentication key over the one or more relations between one or more primary keys (PK) and one or more foreign keys FK of one or more tables of the database 160. A procedure to propagate the at least one authentication key may be implemented as follows as shown with reference to FIG. 2. If their exists an authentication key AK in an instance relation (or table) r1 of a database 160 and if for each further instance relation (or table) r2 containing a foreign key FK which matches a primary key PK in the table r1, then the authentication key AK is propagated to the table r2. Furthermore, the authentication key AK is enforced with a trigger (operation). Formally the propagation of at least one authentication key AK using at least one trigger may be defined as follows:

$\forall$ r where r1, r2 $\subset$ r, r $\subset$ relation
if PK1$\in$r1 and FK1$\in$r2 such that r1[PK1]=r2[FK1]
and if $\exists$AK1$\in$r1
then AK1$\in$r2.

After having defined or specified at least one authentication key AK for at least one table r1 of the database 160, at least one trigger over the authentication key AK according to a required controlling authentication level is implemented. In one implementation, the at least one trigger enforces the at least one authentication key prior to any insert, update, and/or delete operations.

Using triggers to enforce authentication 161 on the table level of a database 160 additional capacity is provided to enforce an authorization or access control mechanism 163 on the database 160. For this purpose, a requester 170-3 should have relevant authorization for carrying out his/her activities defined within at least one trigger. If execution of the trigger fails, a rollback operation on the database 160 may reset the corresponding insert, update, and/or delete operations. Furthermore, the trigger may call at least one further trigger implicitly and at least one database procedure explicitly and thus (substantially) correctly implements or enforces propagation through one or more referential integrity constraints for the database level authentication mechanism.

Figure 4:
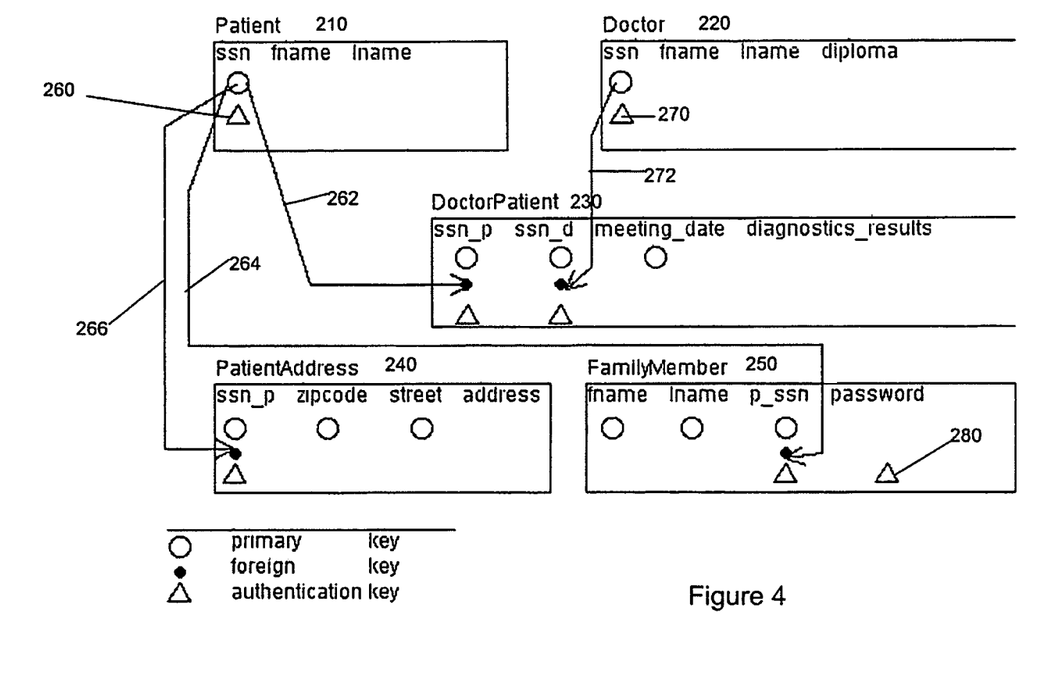
FIG. 4 shows an example propagation of at least one authentication key among database tables.
Figure 5:
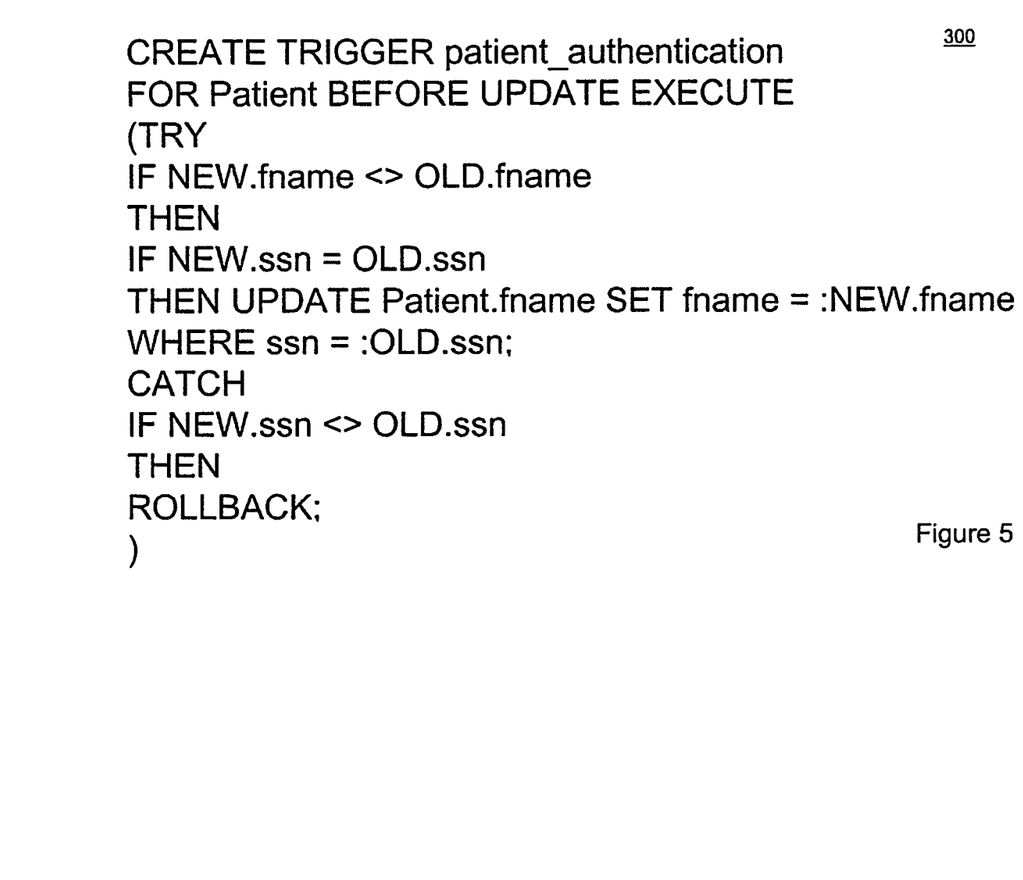
FIG. 5 shows an example implementation of a trigger on a database table. It enforces the authentication of the requester at RDBMS level by checking the credential available in the query, issued from the web interface, with respect to the Authentication Key stored on the database table.

With reference to FIGS. 3 to 5 authentication enforcement at the table level of a database 200 based on at least one authentication key defined for at least one table 260 of the database 200 is shown by example. FIG. 4 shows an example health database 200 having five relations: Patient 210, Doctor 220, DoctorPatient 230, PatientAddress 240, FamilyMember 250. For each of the relations 210, 220, 230, 240, 250, a primary key 212, 222, 232, 242, 252 is defined, which is underlined in FIG. 3. Furthermore, some of the relations 230, 240, 250 comprise one or more foreign keys 231, 233, 251, which are set in italic font in FIG. 3.

In order to specify at least one authentication key for at least one of the relations 210, 220, 230, 240, 250 of the database 200, the most appropriate attributes in each relation 210, 220, 230, 240, 250 in order to identify at least one to authenticate a requester are considered or checked. In other words, one or more authentication keys are identified which refer to those attributes of the relations 210, 220, 230, 240, 250 which may be used to challenge a requester in a way to authenticate him/her. Furthermore, the one or more authentication keys should be labeled to one or more tables 210, 220, 230, 240, 250 of the database 200, which may be directly accessed through a web site on a server 150, when a requester 170-3 requests for access. With reference to the health database 200, following authentication keys are chosen: the attribute ssn 260 for the Patient relation 210, the attribute ssn 270 for the Doctor relation 220, and the attribute password 280 for the FamilyMember relation 250. For the remaining relations 230, 240 no explicit authentication keys are defined. The authentication keys 260, 270, 280 are propagated over the tables 210, 220, 230, 240, 250 of the database 200 linked through one or more referential integrity constraints 262, 264, 266, 272.

Propagation of the authentication keys 260, 270, 280 through the referential integrity constraints 262, 264, 266, 272 of the database 200 is exemplified with reference to FIG. 4. The referential integrity constraints 262, 264, 266, 272 are represented by directed edges between a primary key 212 and a corresponding foreign key 231. Accordingly, for each authentication key 260, 270, 280 and for each referential integrity constraint 262, 264, 266, 272 the authentication enforcement algorithm as formally introduced above is applied. Consequently, attribute ssn_p of table PatientAddress 240, attribute ssn_p of table FamilyMember 250, and attribute ssn_p of table DoctorPatient 230 are added as authentication keys. This is done by propagating the referential integrity constraints 262, 264, 266 defined for primary key ssn 212 which is defined to be the authentication key 260 for the Patient relation 210 in view of its foreign keys 231, 241, 251 in the respective tables 230, 240, 250, accordingly. Similarly, attribute ssn_d of table DoctorPatient 230 is added as an authentication key by propagating the authentication key 270 of the Doctor relation 220 using the respective referential integrity constraint 272 to foreign key ssn_d 233 of the DoctorPatient table 230.

FIG. 5 shows an example implementation of a trigger 300 on the Patient table 210 of the health database 200 used with the authentication key ssn 260, as previously specified. Each time a requester 170-3 submits a query to the database 200, the trigger 300 checks the availability of the authentication key 260. The query may be submitted by the requester 170-3 either from a client 140 or form a server 150, i.e. either client-side or server-side.

In one example, an attacker may use a tunnel (e.g. a covered channel) to bypass server-side authentication and try to update the PatientAddress table 240. The table 240 does not comprise an authentication key. However, due to propagation of authentication keys through referential integrity constraints, it is possible to propagate the authentication key ssn 260 of the Patient table 210 to the PatientAddress table 240 using at least one of the referential integrity constraints 262, 264, 266, 272 defined for the database 200. Accordingly, a before update trigger is implemented, which is called on the PatientAddress table 240 prior to any update. This before update trigger merely calls a patient authentication trigger 300, which asks for the authentication key 260. If the authentication key 260 is available for the trigger 300, then the authentication key 260 is triggered to the PatientAddress table 240 through the referential integrity constraint 264 between the primary key 212 of the Patient table 210 (which is defined to be the authentication key 260 for this table 210) and the corresponding foreign key 241 of the PatientAddress table 240. In one implementation, the authentication key 260 is available for the trigger 300, if a requester 170-3 has submitted his/her query through a web interface on a server 150, where all the data required is available. In case the authentication key 260 is not available for the trigger 300, the trigger executes a rollback operation and stops a possible attack.

Figure 6:
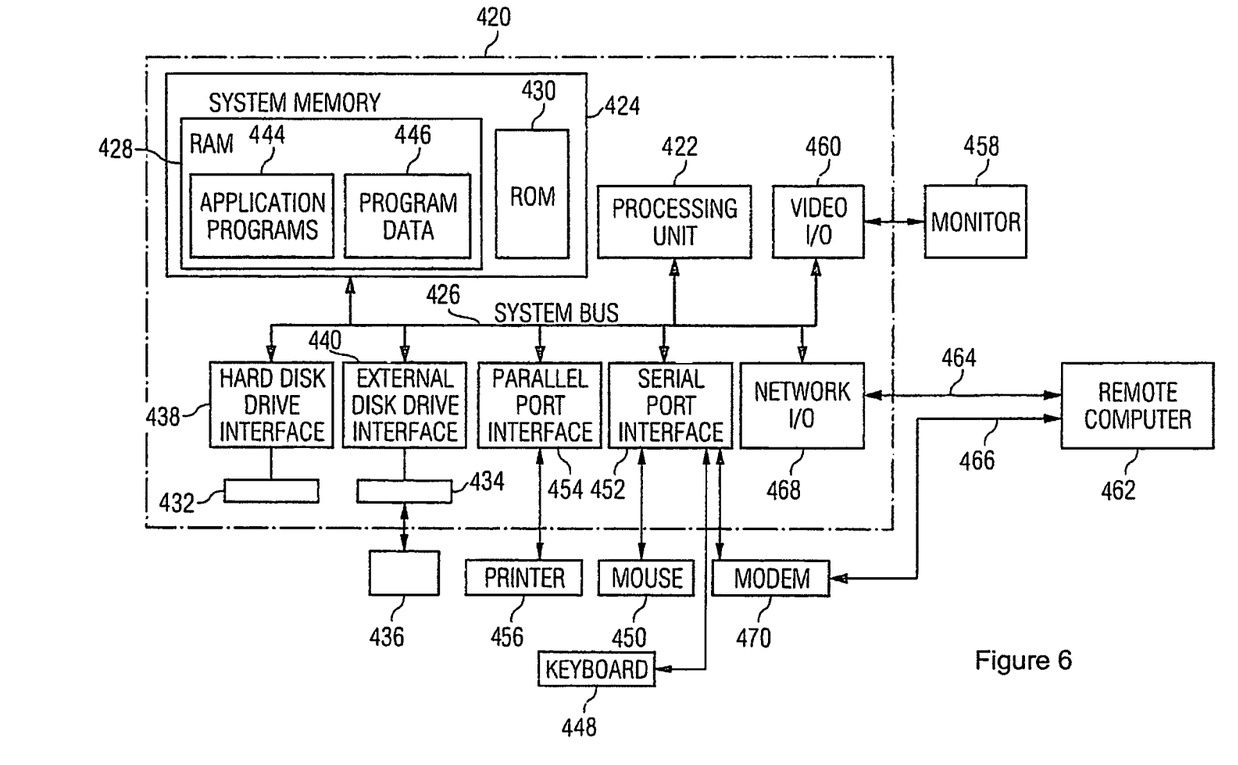
FIG. 6 shows an example computer (network) system.

With reference to FIG. 6, an example system for implementing the application includes a general purpose computing device in the form of a conventional computing environment 420 (e.g. personal computer), including at least one processing unit 422 a system memory 424, and a system bus 426, that couples various system components including the system memory 424 to the processing unit 422. The processing unit 422 may perform arithmetic, logic and/or control operations by accessing system memory 424. The system memory 424 may store information and/or instructions for use in combination with processing unit 422. The system memory 424 may include volatile and non-volatile memory, such as random access memory (RAM) 428 and read only memory (ROM) 430. A basic input/output system (BIOS) containing the basic routines that helps to transfer information between elements within the personal computer 420, such as during start-up, may be stored in ROM 430. The system bus 426 may be any of several types of bus structures including a memory bus or memory controller, a peripheral bus, and a local bus using any of a variety of bus architectures.

The personal computer 420 may further include a hard disk drive 432 for reading from and writing to a hard disk (not shown), and an external disk drive 434 for reading from or writing to a removable disk 436. The removable disk may be a magnetic disk for a magnetic disk driver or an optical disk such as a CD ROM for an optical disk drive. The hard disk drive 434 and external disk drive 434 are connected to the system bus 426 by a hard disk drive interface 438 and an external disk drive interface 440, respectively. The drives and their associated computer-readable media provide nonvolatile storage of computer readable instructions, data structures, program modules and other data for the personal computer 420. The data structures may include relevant data of the implementation of the alternating processing method for processing an incoming message stream 30, as described in greater detail above. The relevant data may be organized in a database, for example a relational or object database.

Although the example environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the example operating environment.

A number of program modules may be stored on the hard disk 432, external disk, ROM 430 or RAM 428, including an operating system (not shown), one or more application programs 444, other program modules (not shown), and program data 446. The application programs may include at least a part of the functionality as detailed in FIGS. 1 to 6.

A user may enter commands and information, as discussed below, into the personal computer 420 through input devices such as keyboard 448 and mouse 450. Other input devices (not shown) may include a microphone (or other sensors), joystick, game pad, scanner, or the like. These and other input devices may be connected to the processing unit 422 through a serial port interface 452 that is coupled to the system bus 426, or may be collected by other interfaces, such as a parallel port interface 454, game port or a universal serial bus (USB). Further, information may be printed using printer 456. The printer 456, and other parallel input/output devices may be connected to the processing unit 422 through parallel port interface 454. A monitor 458 or other type of display device is also connected to the system bus 426 via an interface, such as a video input/output 460. In addition to the monitor, computing environment 420 may include other peripheral output devices (not shown), such as speakers or other audible output.

The computing environment 420 may communicate with other electronic devices such as a computer, telephone (wired or wireless), personal digital assistant, television, or the like. To communicate, the computer environment 420 may operate in a networked environment using connections t6 one or more electronic devices. FIG. 6 depicts the computer environment networked with a remote computer 462. The remote computer 462 may be another computing environment such as a server, a router, a network PC, a peer device or other common network node, and may include many or all of the elements described above relative to the computing environment 420. The logical connections depicted in FIG. 6 include a local area network (LAN) 464 and a wide area network (WAN) 466. Such networking environments are commonplace in offices, enterprise-wide computer networks, intranets and the Internet.

When used in a LAN networking environment, the computing environment 420 may be connected to the LAN 464 through a network I/O 468. When used in a WAN networking environment, the computing environment 420 may include a modem 470 or other means for establishing communications over the WAN 466. The modem 470, which may be internal or external to computing environment 420, is connected to the system bus 426 via the serial port interface 452. In a networked environment, program modules depicted relative to the computing environment 420, or portions thereof, may be stored in a remote memory storage device resident on or accessible to remote computer 462. Furthermore other data relevant to the application of the authentication method for databases (described above) may be resident on or accessible via the remote computer 462. The data may be stored for example in an object or a relation database. It will be appreciated that the network connections shown are example and other means of establishing a communications link between the electronic devices may be used.

The above-described computing system is only one example of the type of computing system that may be used authentication enforcement at the database level.

List of Reference Numerals
100 client-server architecture
110, 120, 130 web application
140 client
150 server
160 resource
160-1, 160-2, 160-3 database
170-1, 170-2, 170-3 requester
144 client-level
141 client-site authentication mechanism
143 client-site authorization mechanism
154 server-level
151 server-site authentication mechanism
153 server-site authorization mechanism
164 resource-level
161 resource-site authentication mechanism
163 resource-site authorization mechanism
R1, R2 relation
r1, r2 table (relation instance)
t1, t2 tuple
PK primary key
FK foreign key
AK authentication key
200 database
210, 220, 230, 240, 240 relation
211, 213, 215 attribute 217 tuple
219 field
212, 222, 232, 242, 252 primary key
231, 233, 241, 251 foreign key
260, 270, 280 authentication key
262, 264, 266, 272 referential integrity constraint
300 trigger
420 conventional computing environment
422 processing unit
424 system memory
426 system bus
428 random access memory (RAM)
430 read only memory (ROM)
432 hard disk drive
434 external disk drive
436 removable disk
438 hard disk drive interface
440 external disk drive interface
444 one or more application programs
446 program data
448 keyboard
450 mouse
452 serial port interface
454 parallel port interface
456 printer
458 monitor
460 video input/output
462 remote computer
464 local area network (LAN)
466 wide area network (WAN)
468 network I/O
470 a modem

What is claim is:

1. A computer-implemented method comprising:
providing authentication enforcement at resource level by:
  receiving, at a server, a request from a requester through a client to access a particular database of a resource;
  enforcing authentication of the requester by challenging the requester to provide at least one authentication credential corresponding to at least one authentication key that is an attribute of a table of the particular database being accessed to verify an identity of the requester, the at least one authentication key being specified at design time; and
  authenticating the requester by comparing the at least one authentication credential against the at least one authentication key that is an entry of the attribute in the table of the particular database being accessed.

2. The method according to claim 1, wherein enforcing authentication of the requester further comprises:
propagating the at least one authentication key through at least one cross-reference between the table and at least one further table of the particular database being accessed.

3. The method according to claim 2, wherein the at least one cross-reference is at least one referential integrity constraint between the table and the at least one further table of the particular database being accessed.

4. The method according to claim 3, wherein the at least one referential integrity constraint defines a relationship between at least one primary key of the table and at least one foreign key of the at least one further table of the particular database being accessed.

5. The system according to claim 2, wherein the authentication mechanism is further operable to perform operations comprising:
enforcing the at least one authentication key through a database management system.

6. The method according claim 1 further comprising:
monitoring the at least one authentication key by at least one trigger.

7. The method according to claim 6 further comprising:
the at least one trigger obliging the requester to provide the at least one authentication credential represented by the at least one authentication key, the at least one authentication credential being a shared secret.

8. The method according to claim 1, wherein enforcing is performed by enforcing the at least one authentication key through at least one trigger operation.

9. The method according to claim 8, wherein enforcing the at least one authentication key through the at least one trigger operation is performed prior to an insert, update, and/or delete operation performed on the table.

10. The method according to claim 1, wherein enforcing is performed by enforcing the at least one authentication key through a database management system.

11. The method according to claim 1 further comprising:
invoking a rollback operation in case of an authentication failure.

12. The method of claim 1, wherein the authentication key does not include a null value.

13. A computer program product comprising computer readable instructions, which when loaded and run in a computer or computer network system, causes the computer system or the computer network system to perform operations including:
receiving, at a server, a request from a requester through a client to access a particular database of a resource;
enforcing authentication of the requester by challenging the requester to provide at least one authentication credential corresponding to at least one authentication key that is an attribute of table of the particular database being accessed to verify an identity of the user, the at least one authentication key being specified at design time; and
authenticating the requester by comparing the at least one authentication credential against the at least one authentication key that is an entry of the attribute in the table of the particular database being accessed.

14. A non-transitory machine-readable medium embodying instructions, which when executed by at least one processing unit of a machine, cause the machine to perform operations comprising:
receiving, at a server, a request from a requester through a client to access a particular database of a resource;
enforcing authentication of the requester by challenging the requester to provide at least one authentication credential corresponding to at least one authentication key that is an attribute of a table of the particular database being accessed to verify an identity of the requester, the at least one authentication key being specified at design time; and
authenticating the requester by comparing the at least one authentication credential against the at least one authentication key that is an entry of the attribute in the table of the particular database being accessed.

15. A computer system comprising:
an authentication mechanism having at least one processing unit for authentication enforcement at a table level of a particular database, operable to perform operations comprising:
receiving, at a server, a request from a requester through a client to access the particular database in a resource;

enforcing authentication of the requester by challenging the requester to provide at least one authentication credential corresponding to at least one authentication key that is an attribute of a table of the particular database being accessed to verify an identity of the requester, the at least one authentication key being specified at design time; and authenticating the requester by comparing the at least one authentication credential against the at least one authentication key that is an entry of the attribute in the table of the particular database being accessed.

16. A computer program product comprising computer readable instructions store on a device, which when loaded and run in a computer or computer network system, causes the computer system or the computer network system to perform operations including:

receiving at a server a request from a requester through a client to access a particular database of a resource;

enforcing authentication of the requester by challenging the requester to provide at least one authentication credential corresponding to at least one authentication key that is an attribute of a table of the particular database being accessed to verify an identity of the user, the at least one authentication key being specifying at design time; and authenticating the requester by comparing the at least one authentication credential against the at least one authentication key that is an entry of the attribute in the table of the particular database being accessed.

17. The system according to claim 16, wherein the at least one cross-reference is at least one referential integrity constraint between the table and the at least one further table of the particular database being accessed.

18. The system according to claim 15, wherein the authentication mechanism is further operable to perform operations comprising:

monitoring the at least one authentication key by at least one trigger.

19. The system according to claim 18, wherein the at least one trigger is operable to perform operations comprising:

obliging the requester to provide the at least one authentication credential represented by the at least one authentication key, the at least one authentication credential being a shared secret.

20. The system according to claim 15, wherein the authentication mechanism is further operable to perform operations comprising:

enforcing the at least one authentication key through at least one trigger operation.

21. The system according to claim 20, wherein the at least one trigger is operable to enforce the at least one authentication key prior to an insert, update, or delete operation performed on the table.

22. The system according to claim 15, wherein the authentication mechanism is further operable to perform operations comprising:

invoking a rollback operation in case of an authentication failure.

* * * * *